US008930462B1

(12) United States Patent
Banerjee

(10) Patent No.: US 8,930,462 B1
(45) Date of Patent: Jan. 6, 2015

(54) TECHNIQUES FOR ENFORCING DATA SHARING POLICIES ON A COLLABORATION PLATFORM

(75) Inventor: Deb Banerjee, Cupertino, CA (US)

(73) Assignee: Symantec Corporation, Mountain View, CA (US)

(*) Notice: Subject to any disclaimer, the term of this patent is extended or adjusted under 35 U.S.C. 154(b) by 208 days.

(21) Appl. No.: 13/175,977

(22) Filed: Jul. 5, 2011

(51) Int. Cl.
G06F 15/16 (2006.01)
(52) U.S. Cl.
USPC .......................................... 709/205; 705/300
(58) Field of Classification Search
None
See application file for complete search history.

(56) References Cited

U.S. PATENT DOCUMENTS

| 7,392,375 | B2* | 6/2008 | Bartram et al. ............... 713/152 |
| 8,073,486 | B2* | 12/2011 | Mundarath et al. ......... 455/553.1 |
| 8,082,509 | B2* | 12/2011 | Orsolini et al. ............... 715/751 |
| 8,374,650 | B2* | 2/2013 | Kotecha et al. ............... 455/561 |
| 2003/0105734 | A1* | 6/2003 | Hitchen et al. .................... 707/1 |
| 2003/0195932 | A1* | 10/2003 | Tanabe et al. ................. 709/205 |
| 2003/0217266 | A1* | 11/2003 | Epp et al. ....................... 713/163 |
| 2004/0054885 | A1* | 3/2004 | Bartram et al. ............... 713/152 |
| 2006/0117378 | A1* | 6/2006 | Tam et al. .......................... 726/3 |
| 2006/0236247 | A1* | 10/2006 | Morita et al. ................. 715/733 |
| 2006/0242632 | A1* | 10/2006 | Orsolini et al. ............... 717/140 |
| 2007/0220016 | A1* | 9/2007 | Estrada et al. ................. 707/100 |
| 2008/0075058 | A1* | 3/2008 | Mundarath et al. ........... 370/342 |
| 2008/0076370 | A1* | 3/2008 | Kotecha et al. ............. 455/187.1 |
| 2008/0307488 | A1* | 12/2008 | Hammond et al. ................ 726/1 |
| 2009/0089682 | A1* | 4/2009 | Baier et al. .................... 715/751 |
| 2009/0157667 | A1* | 6/2009 | Brougher et al. .................. 707/5 |
| 2009/0172776 | A1* | 7/2009 | Makagon et al. ................. 726/2 |
| 2009/0199274 | A1* | 8/2009 | Frazier et al. ..................... 726/4 |
| 2009/0228801 | A1* | 9/2009 | Lee et al. ....................... 715/730 |
| 2009/0234920 | A1* | 9/2009 | Gist et al. ...................... 709/204 |
| 2009/0268227 | A1* | 10/2009 | Kaneko ........................ 358/1.14 |
| 2010/0037058 | A1* | 2/2010 | Zhuk .............................. 713/176 |
| 2010/0082747 | A1* | 4/2010 | Yue et al. ...................... 709/204 |
| 2010/0138037 | A1* | 6/2010 | Adelberg et al. ............. 700/241 |
| 2010/0146608 | A1* | 6/2010 | Batie et al. ........................ 726/7 |
| 2010/0153364 | A1* | 6/2010 | Kirby ............................ 707/722 |
| 2012/0030288 | A1* | 2/2012 | Burckart et al. .............. 709/205 |
| 2012/0047449 | A1* | 2/2012 | Burckart et al. .............. 715/753 |

* cited by examiner

Primary Examiner — Ninos Donabed
(74) Attorney, Agent, or Firm — Wilmer Cutler Pickering Hale and Dorr LLP

(57) ABSTRACT

Techniques for enforcing data sharing policies on a collaboration platform are disclosed. In one particular embodiment, the techniques may be realized as a system for enforcing data sharing policies on a collaboration platform including a communication module configured to capture a subscription request from a first user to follow a second user in a collaboration platform. The system may also include an asset and profile module including at least one computer processor configured to determine authorization classification associated the first user and the second user. The system may further include an enforcement module including at least one computer processor configured to determine whether to approve the subscription request based at least in part on the authorization classification associated with the first user and the second user.

18 Claims, 5 Drawing Sheets

TECHNIQUES FOR ENFORCING DATA SHARING POLICIES ON A COLLABORATION PLATFORM

FIELD OF THE DISCLOSURE

The present disclosure relates generally to enforcing data sharing policies and, more particularly, to techniques for enforcing data sharing policies on a collaboration platform.

BACKGROUND OF THE DISCLOSURE

Enterprise collaboration platforms, such as SalesForce Chatter™, may allow a user to generate feeds that track data record updates, user status, and/or share comments from other users. Enterprise collaboration platforms may also allow users to follow each other's feeds and view data record updates in the feeds. The data records associated with the feeds may contain confidential or proprietary information that may only be available to authorized users as per enterprise policy. Oftentimes, an unauthorized user may access the confidential or proprietary information contained in the data records of the feeds by directly or indirectly following an authorized user of the enterprise collaboration platforms. Thus, confidential or proprietary information may be accessed by unauthorized users.

In view of the foregoing, it may be understood that there may be significant problems and shortcomings associated with current techniques for enforcing data sharing policies on a collaboration platform.

SUMMARY OF THE DISCLOSURE

Techniques for enforcing data sharing policies on a collaboration platform are disclosed. In one particular embodiment, the techniques may be realized as a system for enforcing data sharing policies on a collaboration platform comprising a communication module configured to capture a subscription request from a first user to follow a second user in a collaboration platform. The system may also comprise an asset and profile module comprising at least one computer processor configured to determine authorization classification associated the first user and the second user. The system may further comprise an enforcement module comprising at least one computer processor configured to determine whether to approve the subscription request based at least in part on the authorization classification associated with the first user and the second user.

In accordance with other aspects of this particular embodiment, the communication module may be further configured to receive a user identification and a user password from at least one of the first user and the second user to login to the collaboration platform.

In accordance with further aspects of this particular embodiment, the asset and profile module may be further configured to store user profiles of the first user and the second user.

In accordance with additional aspects of this particular embodiment, the asset and profile module may be further configured to store a share graph of the collaboration platform.

In accordance with yet another aspect of this particular embodiment, the enforcement module may be further configured to determine whether followers of the first user are authorized to follow the second user.

In accordance with still another aspect of this particular embodiment, a communication module configured to capture feeds having data provided by the first user and the second user in the collaboration platform.

In accordance with other aspects of this particular embodiment, the communication module may be further configured to transmit notification messages to one or more followers of at least one of the first user and the second user.

In accordance with further aspects of this particular embodiment, a data sharing policy module configured to store data sharing policies of the collaboration platform.

In accordance with additional aspects of this particular embodiment, the data sharing policies may classify data into various categories based at least in part on authorization.

In accordance with yet another aspect of this particular embodiment, the data sharing policies may classify data into various categories based at least in part on activities.

In another particular embodiment, the techniques may be realized as a method for enforcing data sharing policies on a collaboration platform comprising capturing, using a communication module, a subscription request from a first user to follow a second user in a collaboration platform. The method may also comprise determining, using an asset and profile module comprising at least one computer processor, authorization classification associated the first user and the second user. The method may further comprise determining, using an enforcement module comprising at least one computer processor, whether to approve the subscription request based at least in part on the authorization classification associated with the first user and the second user.

In accordance with other aspects of this particular embodiment, the method may further comprise subscribing the first user to follow the second user based at least in part on a determination to approve the subscription request.

In accordance with further aspects of this particular embodiment, the method may further comprise determining one or more followers of the first user.

In accordance with additional aspects of this particular embodiment, the method may further comprise determining whether the one or more followers of the first user are authorized to follow the second user.

In accordance with yet another aspect of this particular embodiment, the method may further comprise unsubscribing the one or more followers of the first user from the first user based at least in part on a determination that the one or more followers of the first user are not authorized to follow the second user.

In accordance with still another aspect of this particular embodiment, at least one non-transitory processor readable storage medium for storing a computer program of instructions configured to be readable by at least one processor for instructing the at least one processor to execute a computer process for performing the method.

In another particular embodiment, the techniques may be realized as a method for enforcing data sharing policies on a collaboration platform comprising receiving, using a communication module, an access request from a first user to access data provided by a second user in a collaboration platform. The method may also comprise determining, using an asset and profile module comprising at least one computer processor, an authorization classification associated the first user and the second user and a classification category of the data provided by the second user. The method may further comprise determining, using an enforcement module comprising at least one computer processor, whether to approve the access request based at least in part on the authorization classification associated with the first user and the classification category of the data provided by the second user.

In accordance with other aspects of this particular embodiment, the method may further comprise providing data provided by the second user to the first user based at least in part on a determination to approve the access request.

In accordance with further aspects of this particular embodiment, the method may further comprise denying data provided by the second user to the first user based at least in part on a determination to deny the access request.

In accordance with additional aspects of this particular embodiment, at least one non-transitory processor readable storage medium for storing a computer program of instructions configured to be readable by at least one processor for instructing the at least one processor to execute a computer process for performing the method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
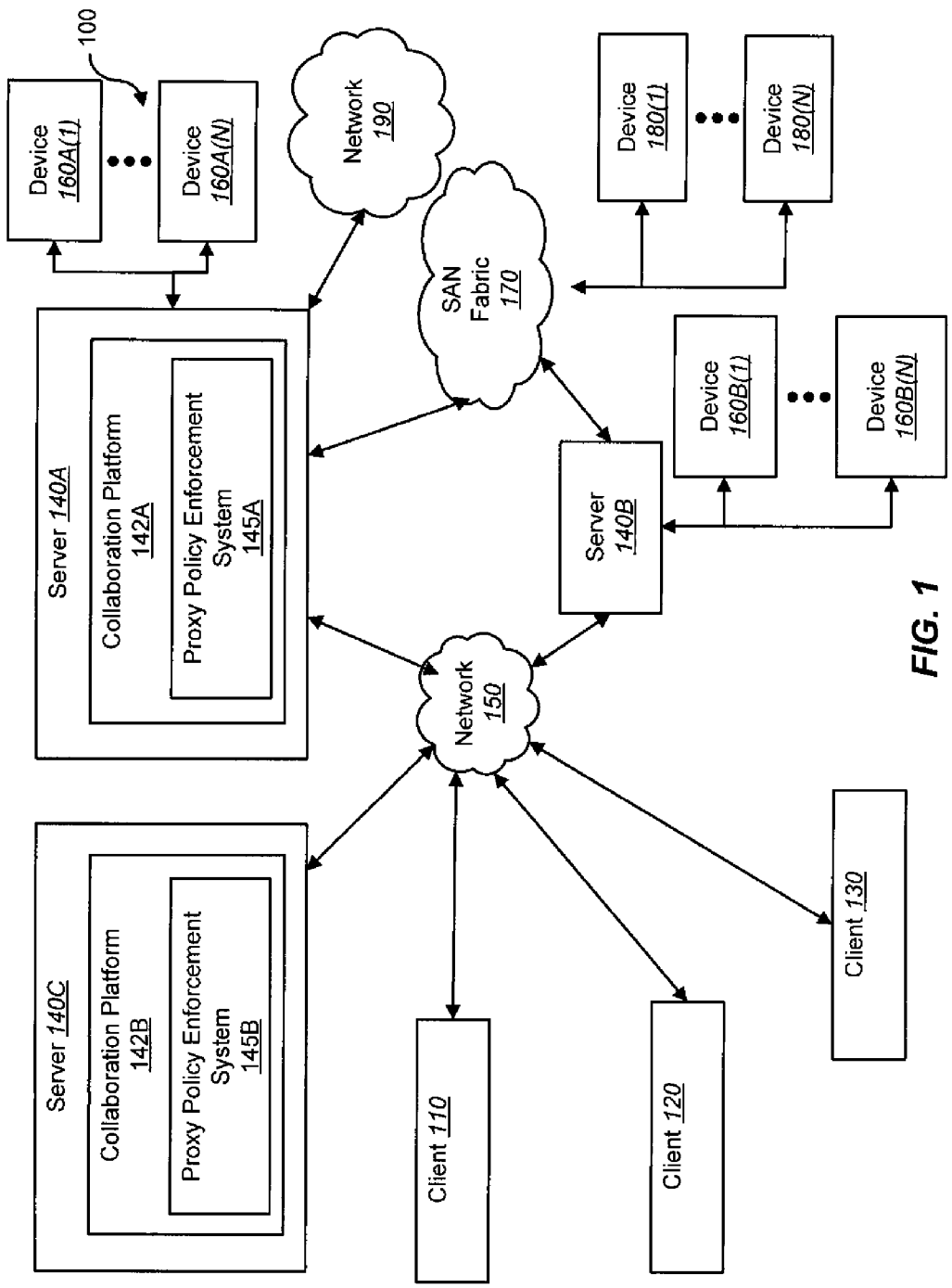
FIG. 1 shows a block diagram depicting a network architecture for enforcing data sharing policies on a collaboration platform in accordance with an embodiment of the present disclosure.

FIG. 1 shows a block diagram depicting a network architecture 100 for enforcing data sharing policies on a collaboration platform in accordance with an embodiment of the present disclosure. FIG. 1 is a simplified view of network architecture 100, which may include additional elements that are not depicted. Network architecture 100 may contain clients 110-130 and servers 140A-140C (one or more of which may be implemented using computer system 200 shown in FIG. 2). Clients 110-130 may be communicatively coupled to a network 150. Server 140A may be communicatively coupled to networks 190 and 150. Server 140B may be communicatively coupled to storage devices 160A(1)-(N). Server 140B may be communicatively coupled to a SAN (Storage Area Network) fabric 170. SAN fabric 170 may support access to storage devices 180(1)-(N) by server 140B, and by clients 110-130 via network 150. Server 140C may be communicatively coupled to the clients 110-130 and the server 140A via the network 150.

The description below describes network elements, computers, and/or components of a system and method for enforcing data sharing policies on a collaboration platform that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are illustrative. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Servers 140A and 140B may be communicatively coupled to a SAN (Storage Area Network) fabric 170. SAN fabric 170 may support access to storage devices 180(1)-(N) by servers 140A-140C and by clients 110-130 via network 150. Server 140A may be communicatively coupled to network 190. According to an embodiment, servers 140A and 140B may be located inside (e.g., inside the firewall) of an entity. The entity may be an organization, an association, an enterprise, a company, a corporation, or a group of individuals. Server 140C may be communicatively coupled to network 150. According to an embodiment, server 140C may be located outside (e.g., outside the firewall) of an entity.

According to some embodiments, server 140A may be a proxy server, a datacenter, and/or other network device capable of hosting one or more collaboration platforms 142. The collaboration platforms 142 may be uniformed electronic platforms that may support synchronous and asynchronous communications through a variety of devices and channels. The collaboration platforms 142 may allow users of an entity to link to each other and to share data and communications. Server 140A may comprise a platform for hosting a collaboration platform 142A. The collaboration platform 142A may comprise a proxy policy enforcement system 145A. The proxy policy enforcement system 145A may enforce data policies to prevent unauthorized access of data in the collaboration platform 142A. Clients 110-130 may access the collaboration environment 142A hosted by the server 140A when located inside (e.g., inside the firewall) of an entity.

Although as shown in FIG. 1, the proxy policy enforcement system 145 and the collaboration platform 142 are hosted on the same server 140, the proxy policy enforcement system 145 and the collaboration platform 142 may be hosted by different network devices (e.g., clients 110-130 and/or servers 140A-140B). For example, the proxy policy enforcement system 145 may be configured to monitor and/or inspect communications between users and the collaboration platform 142. In a particular embodiment, the proxy policy enforcement system 145 may be configured as a gateway for a data center of an entity, a reverse proxy in a separate data center associated with a collaboration platform, and/or a forward proxy in a separate data center associated with a collaboration platform.

According to some embodiments, server 140C may be a proxy server, a datacenter, and/or other network device capable of hosting one or more collaboration platforms 142. Server 140C may comprise a platform for hosting a collaboration platform 142B. The collaboration platform 142B may comprise a proxy policy enforcement system 145B. The proxy policy enforcement system 145B may enforce data policies to prevent unauthorized access of data in the collaboration environment 142B. Clients 110-130 may access the collaboration environment 142B hosted by the server 104C when located outside (e.g., outside the firewall) of an entity.

The clients 110-130 may be communicatively coupled to the server 140A and the server 140C. For example, the clients 110-130 may directly access the collaboration platform 142A hosted by the server 140A when located inside (e.g., inside the firewall) of an entity. In another embodiment, the clients 110-130 may remotely access the collaboration platform 142A hosted by the server 140A via the collaboration platform 142B hosted by the server 140C. The proxy policy enforcement system 145B hosted by the server 140C may be synchronized (e.g., policies and entitlements) with the proxy policy enforcement system 145A hosted by the server 140A.

Figure 2:
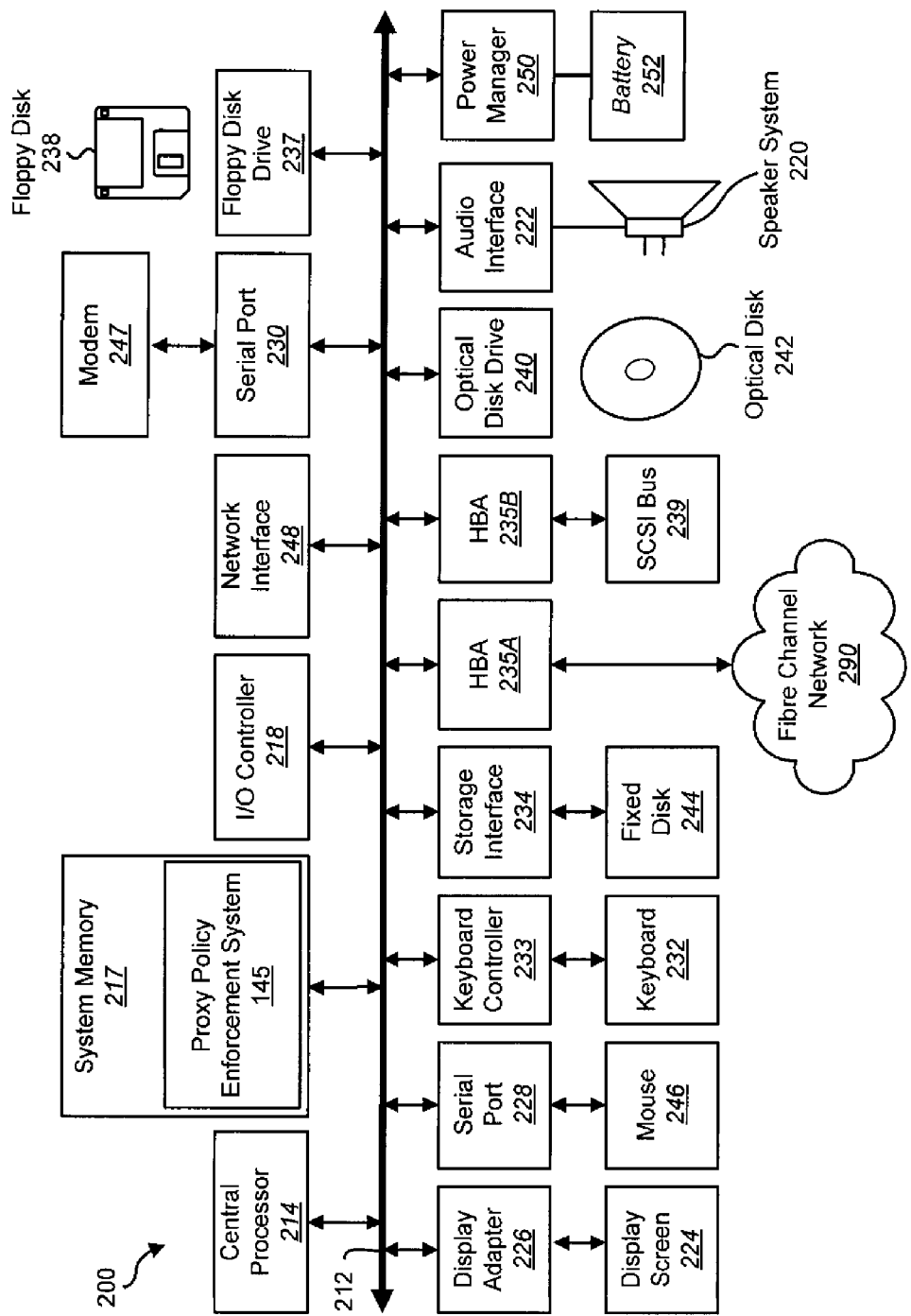
FIG. 2 depicts a block diagram of a computer system in accordance with an embodiment of the present disclosure.

With reference to computer system 200 of FIG. 2, modem 247, network interface 248, or some other method may be used to provide connectivity from of clients 110-130 to network 150. Clients 110-130 may be able to access information on servers 140A-140C using, for example, a web browser or other client software. Such a client may allow clients 110-130 to access data hosted by servers 140A-140C or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110-130, servers 140A-140C, and other devices communicatively coupled to networks 150 and 190. Networks 150 and 190 may further include one, or any number, of the illustrative types of networks mentioned above operating as a stand-alone network or in cooperation with each other. Networks 150 and 190 may utilize one or more protocols of one or more clients 110-130 and/or servers 140A-140C to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to servers 140A-140C. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110-130 may be a smartphone, tablet, PDA, desktop computer, a laptop computer, a server, another computer, or another device coupled via a wireless or wired connection to network 150. Clients 110-130 may receive data from user input, a database, a file, a web service, an application programming interface, and/or a graphical user interface. According to some embodiments, clients 110-130 may be a mobile client such as, for example, a smart phone.

Servers 140A-140C may be application servers, archival platforms, collaboration platforms, backup servers, network storage devices, media servers, email servers, document management platforms, enterprise search servers, enterprise management servers, or other devices communicatively coupled to network 150. Servers 140A-140C may utilize one of storage devices 160A(1)-(N), 160B(1)-(N), and/or 180(1)-(N) for the storage of application data, backup data, or other data. Servers 140A-140C may be hosts, such as an application server, which may process data traveling between clients 110-130 and a collaboration platform, a backup platform, a backup process, and/or storage. According to some embodiments, servers 140A-140C may be platforms used for backing up and/or archiving data.

According to some embodiments, the proxy policy enforcement system 145A may provide data policy enforcement to prevent unauthorized access to confidential or proprietary data. For example, the proxy policy enforcement system 145 may provide approval or denial of a first user to follow a second user. The proxy policy enforcement system 145 may receive a subscription request from a first user to follow a second user. The proxy policy enforcement system 145 may approve the subscription request from the first user to follow the second user if the first user is authorized to access data that the second user is authorized to access. The proxy policy enforcement system 145 may deny the subscription request from the first user to follow the second user if the first user is not authorized to access data that the second user is authorized to access.

The proxy policy enforcement system 145 may determine whether pre-existing followers of the first user is authorized to access data that the second user is authorized to access. For example, a first user may be approved to subscribe to a second user because the first user is authorized to access data that the second user is authorized to access. The proxy policy enforcement system 145 may determine whether pre-existing followers of the first user have authorization to access data that the second user is authorized to access. When the pre-existing followers of the first user is not authorized to access data that the second user is authorized to access, the proxy policy enforcement system 145 may deny the pre-existing followers to continue to follow the first user.

The proxy policy enforcement system 145 may also determine whether pre-existing followers of the first user is authorized to access data that the second user and/or pre-existing followers of the second user are not authorized to access. For example, a first user may be approved to subscribe to a second user because the first user is authorized to access data that the second user is authorized to access. The proxy policy enforcement system 145 may determine whether pre-existing followers of the first user have authorization to access data that the second user and/or pre-existing followers of the second user is not authorized to access. When the pre-existing followers of the first user are authorized to access data that the second user and/or pre-existing followers of the second user are not authorized to access, the proxy policy enforcement system 145 may deny a subscription request from the second user to follow the first user.

The proxy policy enforcement system 145 may determine whether a first user is authorized to access data provided by a second user. For example, a second user may provide feeds having data in the collaboration platform 142 and the proxy policy enforcement system 145 may determine whether the first user is authorized to access the feeds having data provided by the second user. In a particular embodiment, a second user may provide feeds having data via hypertext transfer protocol (HTTP) or simple mail transfer protocol in the collaboration platform 142. The proxy policy enforcement system 145 may determine whether to authorize the first user to access the feeds having data provided by the second user.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, proxy policy enforcement system 145 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in a non-transitory computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system. Power manager 250 may monitor a power level of battery 252.

Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
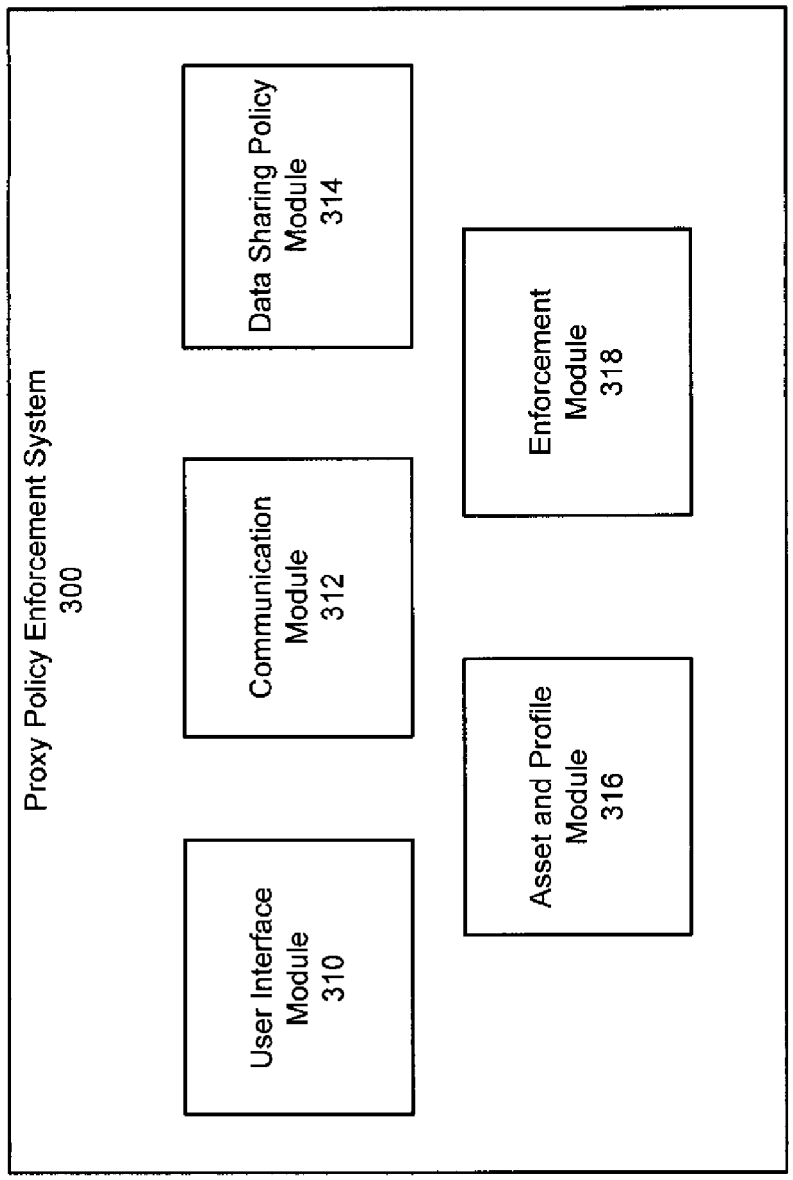
FIG. 3 shows a proxy policy enforcement system in accordance with an embodiment of the present disclosure.

Referring to FIG. 3, there is shown a proxy policy enforcement system 300 in accordance with an embodiment of the present disclosure. As illustrated, the proxy policy enforcement system 300 may contain one or more components or modules including a user interface module 310, a communication module 312, a data sharing policy module 314, an asset and profile module 316, and/or an enforcement module 318.

The user interface module 310 may provide an interface between users (e.g., security administrators) associated with the clients 110-130 and the proxy policy enforcement system 300. For example, the user interface module 310 may enable a user (e.g., security administrator) to define data sharing policies. The user interface module 310 may provide a separate or a unified graphical user interface. The user interface module 310 may include an Application Programming Interface (API) to interact with users (e.g., security administrator) associated with the clients 110-130. In a particular embodiment, the user interface module 310 may present one or more graphical contents or displays to the user (e.g., security administrator) associated with the clients 110-130, server 140A, and/or server 140C. The user interface module 310 may authenticate a user (e.g., security administrator) to login to the proxy policy enforcement system 300. The user interface module 310 may enable a user (e.g., security administrator) for defining data sharing policies in the collaboration platforms 142.

The communication module 312 may comprise at least one computer processor to capture or intercept information and/or communication transmitted between the clients 110-130 and the collaboration platforms 142. The communication module 312 may capture or intercept subscriber identification and/or subscriber password to sign into the collaboration platform 142 via the proxy policy enforcement system 300. The communication module 312 may integrate a single sign-on (SSO) solution for enforcement by the proxy policy enforcement system 300.

The communication module 312 may capture or intercept one or more queries/requests from subscribers associated with clients 110-130 to subscribe to follow another user in a collaboration platform 142. The communication module 312 may capture or intercept one or more queries/requests from subscribers associated with the clients 110-130 to access data provided by another user in the collaboration platform 142. For example, the communication module 312 may capture or intercept a subscription request from a first subscriber associated with a first client 110 to follow a second subscriber associated with a second client 120 in the collaboration platform 142. In another embodiment, the communication module 312 may capture or intercept an access request from a first subscriber associated with a first client 110 to access data provided by a second subscriber associated with a second client 120 in the collaboration platform 142. In response to capturing or intercepting the one or more queries/requests from a subscriber associated with the clients 110-130, the communication module 310 may provide the one or more queries/requests to the user interface module 310, the data sharing policy module 314, the asset and profile module 316, and/or the enforcement module 318. For example, in response to capturing or intercepting the one or more subscription requests and/or access requests from the subscriber associated with the clients 110-130, the communication module 312 may provide the one or more subscription requests and/or access requests to the user interface module 310, the data sharing policy module 314, the asset and profile module 316, and/or the enforcement module 318. For example, users associated with the clients 110-130 may provide feeds with data to the collaboration platforms 142. The communication module 312 may receive or capture feeds having data between the client network elements 110-130 and the collaboration platforms 142. The feeds may be a textual message, a graphical representation, an audio message, and/or other forms of transmitted data. The feeds transmitted from the clients 110-130 to the collaboration platforms 142 may comprise data that may be confidential or proprietary and may be only accessible to authorized users. In a particular embodiment, the feeds transmitted from the clients 110-130 and the collaboration platforms 142 may include identification information (e.g., account identification <Account ID foo>), activities of users (e.g., updates provided by user <user bar> from <init-value> to <final-value>), and/or data records (e.g., account summary or financial summary). The feeds may be transmitted via hypertext transfer protocol (HTTP) or simple mail transfer protocol (SMTP) from the collaboration platforms 142 to the clients 110-130.

The communication module 312 may comprise a database to store the received or captured feeds from clients 110-130 for a predetermined period of time (e.g., a day, a week, a month, or a year). The communication module 312 may detect notification messages from the collaboration platform 142 to one or more subscribers (e.g., followers) of users associated with the clients 110-130 that feeds are available for access. The notification messages may be transmitted to the one or more subscribers of the users associated with the clients 110-130 via hypertext transfer protocol (HTTP) or simple mail transfer protocol (SMTP). For example, the communication module 312 may detect or intercept feeds from users of first client 110. The communication module 312 may capture and store the feeds provided by the user of client 110. The communication module 312 may detect a notification message (e.g., an electronic mail or an Internet message) to users of a second client 120 that subscribes to the first client 110 of the feeds provided by the users of the first client 110. The second client 120 may access the feeds provided by the first client 110 via the communication module 312.

The data sharing policy module 314 may comprise at least one computer processor and/or a database for storing data sharing policies of the proxy policy enforcement system 300. The data sharing policies of the proxy policy enforcement system 300 may comprise a classification of data. For example, the data sharing policies of the proxy policy enforcement system 300 may classify data into various categories based at least in part on authorization and sensitivity. In a particular embodiment, the various categories of data may include, general category, management category, secret category, top secret category, and/or other categories of classifying data. Data of general category may be accessible to every user within an entity. Data of management category may be accessible to management users of an entity. Data of secret category may be accessible to users having secret clearance of an entity. Data of top secret category may be accessible to users having top secret clearance of an entity.

The data sharing policies may classify data into various categories based at least in part on associated activities. In a particular embodiment, categories of data may include, administrative, human resource, financial, business development, accounting, technical, research and development, contacts, clients and/or other activities associated with an entity. For example, data of administrative category may be accessible to users that perform administrative activities. Data of business development may be accessible to users that perform business development activities. Data of accounting category may be accessible to users that perform accounting activities.

The data sharing policy module 314 may comprise predetermined conditional rules to access data. The predetermined conditional rules to access data may allow user to access data that the user normally would not be authorized to access under the data sharing policies. For example, the predetermined conditional rules to access data may include a temporary access rule, a portion rule, an update rule, and/or other conditional rules to access data. In particular embodiment, a temporary access rule may authorize a user to access data temporarily (e.g., for a predetermined period of time) that the user would not be authorized to access. The portion rule may authorize a user to access a portion of data that the user would not be authorized to access. The update rule may authorize a user to access only an updated version of the data that the user would not be authorized to access. The update rule may also deny a user to access an updated version of the data when the user may be authorized to access an original version of the data.

The data sharing policy module 314 may comprise user authorization policies of the proxy policy enforcement system 300. The user authorization policies of the proxy policy enforcement system 300 may comprise a classification of users. For example, the user authorization policies of the proxy policy enforcement system 300 may classify users into various categories based at least in part on authorization and/or activities performed. In a particular embodiment, the various categories of user authorization policies may include, general authorization, management authorization, secret authorization, top secret authorization, and/or other authorizations of classifying users. Users of general authorization may be authorized to access data of general category. Users of management authorization may be authorized to access data of management category. Users of secret authorization are authorized to access data of secret category. Users of top secret authorization are authorized to access data of top secret category. User of lower authorization may not access data of higher classification category while user of higher authorization may access data of lower classification category. For example, users of top secret authorization may be authorized to access data of all classification categories (e.g., general category, management category, secret category, and top secret category). Users of general authorization may be authorized to only access data of general category and may not be authorized to higher classification categories (e.g., management category, secret category, and top secret category).

The user authorization policies may classify users into various categories based at least in part on associated activities performed by the users. In a particular embodiment, categories of user authorization may include, administrative authorization, human resource authorization, financial authorization, business development authorization, accounting authorization, technical authorization, research and development authorization, contacts authorization, clients authorization and/or other activities authorizations associated with an entity. For example, users of administrative authorization may access administrative data. Users of business development authorization may access data of business development. Users of accounting authorization may access data of accounting category.

The asset and profile module 316 may comprise at least one computer processor and a database to store profiles of users associated with the clients 110-130. The user profiles stored in the asset and profile module 316 may comprise activities performed, activities authorization, titles, management level or role, user data authorization category, hierarchy information, subscription list or association information, biographical information, technical background, job description, password, telephone numbers (e.g., work, home, cell, etc), IP addresses, business organizations or other information for identifying a user. The asset and profile module 316 may update the user profile. For example, the asset and profile module 316 may periodically update the user profile. In a particular embodiment, the user profile of the asset and profile module 316 may indicate activities performed by a user and data access authorization granted to the user.

The asset and profile module 316 may comprise a sharing graph of users of an entity based at least in part on the user profile. The sharing graph may present subscription relationship link between the users in the collaboration platform 142. For example, sharing graph may comprise a plurality of nodes representing users of an entity. The plurality of nodes of the sharing graph may be coupled to each other via a subscription relationship link with each other. In a particular embodiment, a first user may be subscribed to follow a second user, a link may be established from a node of the second user to a node of the first user to demonstrate a subscription relationship between the first user and the second user. The second user may be subscribed to follow a third user, a link may be established from a node of the third user to the node of the second user to demonstrate a subscription relationship between the second user and the third user. Subsequently, the first user may be subscribed to follow the third user via the second user. The sharing graph may be formed in a chart display or a diagram display, comprising, but not limited to, organizational chart, tree chart or tree diagram, network diagram, flow chart, cartogram chart, pedigree chart, histogram chart, bar chart, pie chart, line chart, timeline chart, and other types of displays to demonstrate a subscription relationship between various users of an entity.

The enforcement module 318 may comprise at least one computer processor to enforce data sharing policies of the proxy policy enforcement system 300. The enforcement module 318 may enforce data sharing policies based at least in part on the data sharing policies stored in the data sharing policy module 314 and/or user profiles stored in the asset and profile module 316. For example, the enforcement module 318 may provide approval or denial of a first user to follow a second user. The enforcement module 318 may receive a subscription request from a first user to follow a second user. The enforcement module 318 may access the user profile of the asset and profile module 316 to determine whether the first user may subscribe to follow the second user. The enforcement module 318 may approve the subscription request from the first user to follow the second user if the first user is authorized to access data that the second user is authorized to access. The enforcement module 318 may use the subscriber identification to identify and determine data sharing policies for the subscriber to the collaboration platform 142 via the proxy policy enforcement system 300. For example, the enforcement module 318 may identify data authorization associated with the first user and the second user from the user profile of the asset and profile module 316. The enforcement module 318 may approve the subscription request if the first user having management authorization is authorized to access general classification data that the second user having generalization authorization is authorized to access. The enforcement module 318 may approve the subscription request if the first user having administrative authorization is authorized to access administrative classification data that the second user having administrative authorization is authorized to access. The enforcement module 318 may deny the subscription request if the first user having management authorization is not authorized to access secret classification data that the second user having secret authorization is authorized to access. The enforcement module 318 may deny the subscription if the first user having administrative authorization is not authorized to access accounting classification data that the second user having accounting authorization is authorized to access.

The enforcement module 318 may determine whether pre-existing followers of a first user is authorized to access data that the second user is authorized to access. The enforcement module 318 may access sharing graph of the asset and profile module 316 to determine one or more pre-existing followers of the first user. For example, a first user (e.g., top secret authorization) may be approved to follow a second user (e.g., management authorization) because the first user is authorized to access management classification data that the second user is authorized to access. The enforcement module 318 may determine whether pre-existing followers of the first user have authorization to access management classification data that the second user is authorized to access. When the pre-existing followers (e.g., having general authorization) of the first user is not authorized to access management classification data that the second user is authorized to access, the enforcement module 318 may deny the pre-existing followers to continue follow the first user. For example, the enforcement module 318 may delete the subscription relationship link between the pre-existing followers and the first user in the sharing graph.

For example, a first user (e.g., accounting authorization) may be approved to follow a second user (e.g., accounting authorization) because the first user is authorized to access accounting classification data that the second user is authorized to access. The enforcement module 318 may determine whether pre-existing followers of the first user have authorization to access accounting classification data that the second user is authorized to access. When the pre-existing followers (e.g., having administrative authorization) of the first user is not authorized to access accounting classification data that the second user is authorized to access, the enforcement module 318 may deny the pre-existing followers to continue follow the first user. For example, the enforcement module 318 may delete the subscription relationship link between the pre-existing followers and the first user in the sharing graph.

The enforcement module 318 may determine whether a first user is authorized to access data provided by a second user. For example, a second user of secret authorization may provide feeds having various classifications of data. The second user of secret authorization may provide feed having business development classification of data, accounting classification of data, financial classification of data, and/or other classification of data. The second user of secret authorization may provide feeds having generalization classification data, management classification data, and/or secret classification data. The enforcement module 318 may determine whether the first user (e.g., having management authorization) is authorized to access the feeds having data provided by the second user. The enforcement module 318 may determine whether the first user (e.g., having accounting authorization) is authorized to access the feeds having data provided by the second user. In a particular embodiment, a second user may provide feeds having data. The enforcement module 318 may access the data classification of the data sharing policy module 314 to determine data classification category associated with the data in the feeds provided by the second user. The enforcement module 318 may access the user profile of the asset and profile module 316 to determine an authorization classification of a first user trying to access the feeds of the second user.

In a particular embodiment, the enforcement module 318 may determine that the feeds provided by the second user comprise data of secret classification and/or accounting classification. The enforcement module 318 may determine that a first user trying to access the feeds provided by the second user has management authorization and/or administrative authorization. The enforcement module 318 may deny an access request by the first user having management authorization to access secret classification data in the feeds provided by the second user. The enforcement module 318 may also deny an access request by the first user having administrative authorization to access accounting classification data in the feeds provided by the second user. In another embodiment, the enforcement module 318 may determine that the feed provided by the second user comprise data of management classification and the first user trying to access the feeds has management authorization. The enforcement module 318 may approve an access request by the first user having management authorization to access management classification data in the feeds provided by the second user. The enforcement module 318 may also determine that the feed provided by the second user comprise data of accounting classification and the first user trying to access the feeds has accounting authorization. The enforcement module 318 may approve an access request by the first user having accounting authorization to access accounting classification data in the feeds provided by the second user.

Figure 4:
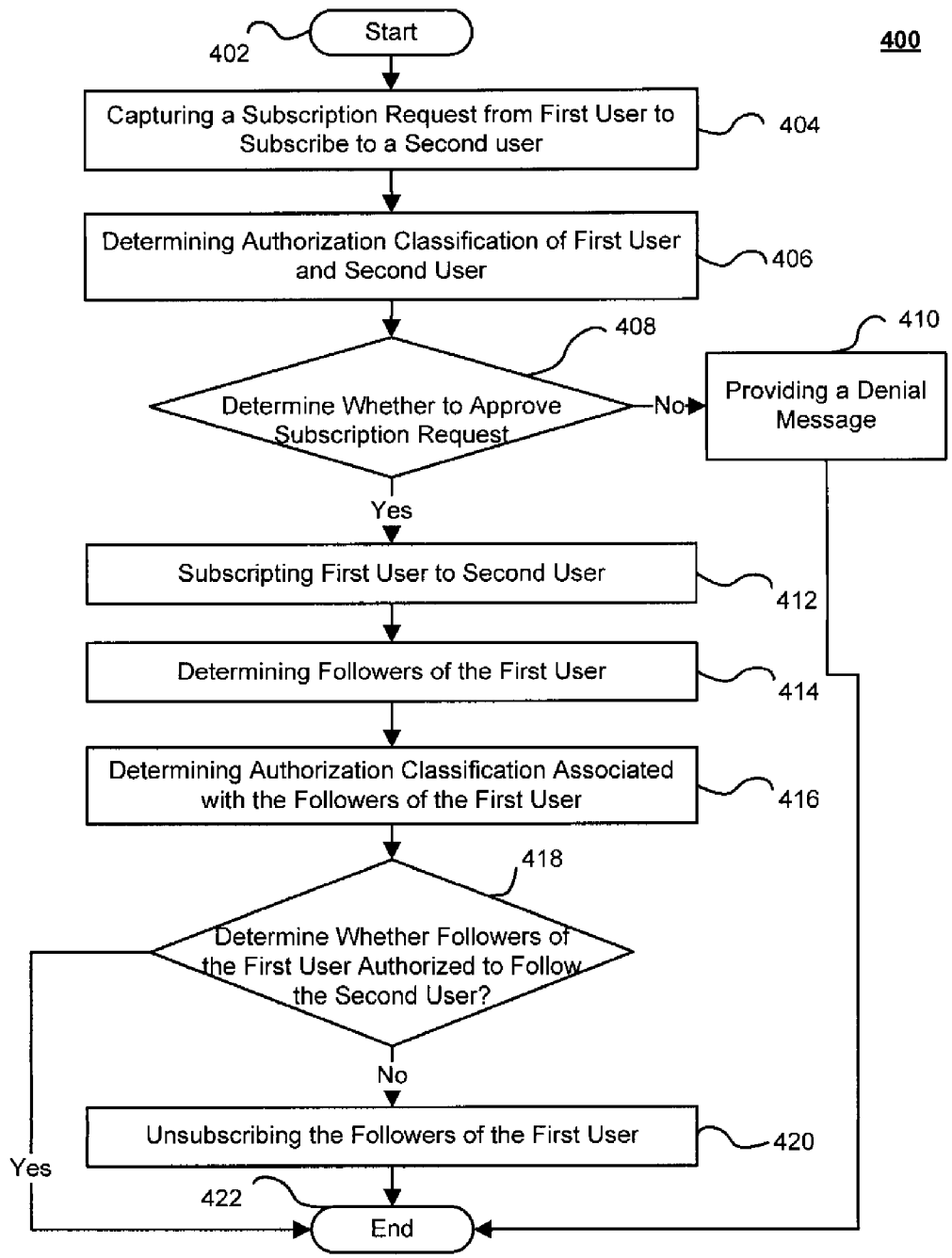
FIG. 4 depicts a method for enforcing data sharing polices on a collaboration platform in accordance with an embodiment of the present disclosure.

Referring to FIG. 4, there is depicted a method 400 for enforcing data sharing policies on a collaboration platform in accordance with an embodiment of the present disclosure. At block 402, the method 400 may begin.

At block 404, a subscription request may be captured from a first user to subscribe to follow a second user. For example, a first user associated with a first client 110 may provide a subscription request to the collaboration platform 142 to subscribe to follow a second user associated with a second client 120 in the collaboration platform 142. The communication module 312 of the proxy policy enforcement system 300 may capture or intercept the subscription request provided by the first user. In a particular embodiment, the subscription request may comprise identification information associated with the first user and the second user. The identification information may comprise name, address, telephone number, IP address, and/or other identification information. The communication module 312 may provide the subscription request to the data sharing policy module 314, the asset and profile module 316, and/or the enforcement module 318.

At block 406, authorization classification of the first user and the second user may be determined. The asset and profile module 316 may determine authorization classification associated with the first user and the second user based at least in part on the subscription request. For example, the asset and profile module 316 may determine identification information associated with the first user and the second user from the subscription request. The asset and profile module 316 may access the user profiles to determine authorization classification of the first user and the second user based at least in part on the identification information. The asset and profile module 316 may utilize the identification information of the first user and the second user to identify user profile of the first user and the user profile of the second user. The asset and profile module 316 may search the user profiles of the first user and the second user to determine the authorization classification of the first user and the second user. The asset and profile module 316 may provide the authorization classification of the first user and the second user to the enforcement module 318.

At block 408, whether the subscription request is approved is determined. For example, the enforcement module 318 may determine whether to approve the subscription request based at least in part on the authorization classification of the first user and the second user. The enforcement module 318 may approve the subscription request if the first user having authorization classification is equal to or higher than the authorization classification of the second user. In a particular embodiment, the enforcement module 318 may approve the subscription request if the first user has top secret authorization classification and the second user has top secret authorization classification. In another embodiment, the enforcement module 318 may approve the subscription request if the first user has top secret authorization classification and the second user has management authorization classification (e.g., top secret authorization classification is higher authorization classification than management authorization classification). In other embodiments, the enforcement module 318 may deny the subscription request if the first user has management authorization classification and the second user has secret authorization classification (e.g., management authorization classification is lower than the authorization level of secret authorization classification).

The enforcement module 318 may also approve the subscription request if the first user having the same activities classification of the second user. In a particular embodiment, the enforcement module 318 may approve the subscription request if the first user has accounting authorization and the second user has accounting authorization classification. In another embodiment, the enforcement module 318 may deny the subscription request if the first user has administrative authorization and the second user has research and development authorization.

At block 410, a denial message may be provided to the first user when the subscription request is denied. For example, the user interface module 310 may provide a denial message to the first user in response to the determination that the subscription request is denied. In a particular embodiment, the denial message may comprise "Your request is denied."

At block 412, the first user may be subscribed to the second user when the subscription request is approved. For example, the asset and profile module 316 may subscribe the first user to follow the second user. The asset and profile module 316 may update a share graph of users of an entity in the collaboration platform 142. In a particular embodiment, the asset and profile module 316 may establish a subscription relationship link from the second user to the first user in response to the enforcement module 318 approving the subscription request.

At block 414, followers of the first user may be determined. For example, the asset and profile module 316 may determine pre-existing followers of the first user. The asset and profile module 316 may access the sharing graph of users of the entity. The asset and profile module 316 may trace the subscription relationship link from the node of the first user in the sharing graph to identify one or more nodes of pre-existing followers of the first user. The asset and profile module 316 may identify the pre-existing followers of the first user by tracing the subscription relationship link of the sharing graph.

At block 416, authorization classification of the pre-existing followers of the first user may be determined. For example, the asset and profile module 316 may identify user profiles associated with the pre-existing followers of the first user. The asset and profile module 316 may determine the authorization classification of the pre-existing followers of the first user from the user profile of the pre-existing followers of the first user.

At block 418, whether the pre-existing followers of the first user are authorized to subscribe to follow the second user may be determined. The enforcement module 318 may receive authorization classification of the pre-existing followers of the first user from the asset and profile module 316. The enforcement module 318 may determine whether the pre-existing followers of the first user is authorized to subscribe to follow the second user based at least in part on the authorization classification of the pre-existing followers of the first user. In a particular embodiment, a first user (e.g., top secret authorization classification) may be approved to subscribe to follow a second user (e.g., management authorization classification) because the first user is authorized to access management classification data that the second user is authorized to access. In another embodiment, a first user (e.g., financial authorization) may be approved to subscribe to follow a second user (e.g., financial authorization) because the first user is authorized to access financial classification data that the second user is authorized to access. The enforcement module 318 may determine whether pre-existing followers of the first user have authorization to access management classification data that the second user is authorized to access.

At block 420, unsubscribing the pre-existing followers of the first user when the pre-existing followers of the first user is not authorized to access data that the second user is authorized to access. For example, the enforcement module 318 may deny the pre-existing followers to continue follow the first user when the pre-existing followers of the first user is not authorized to access data that the second user is authorized to access. The asset and profile module 316 may delete the subscription relationship link between the pre-existing followers and the first user in the sharing graph based at least in part on a determination that the pre-existing followers of the first user is not authorized to access data that the second user is authorized to access.

At block 422, the method 400 may end.

Figure 5:
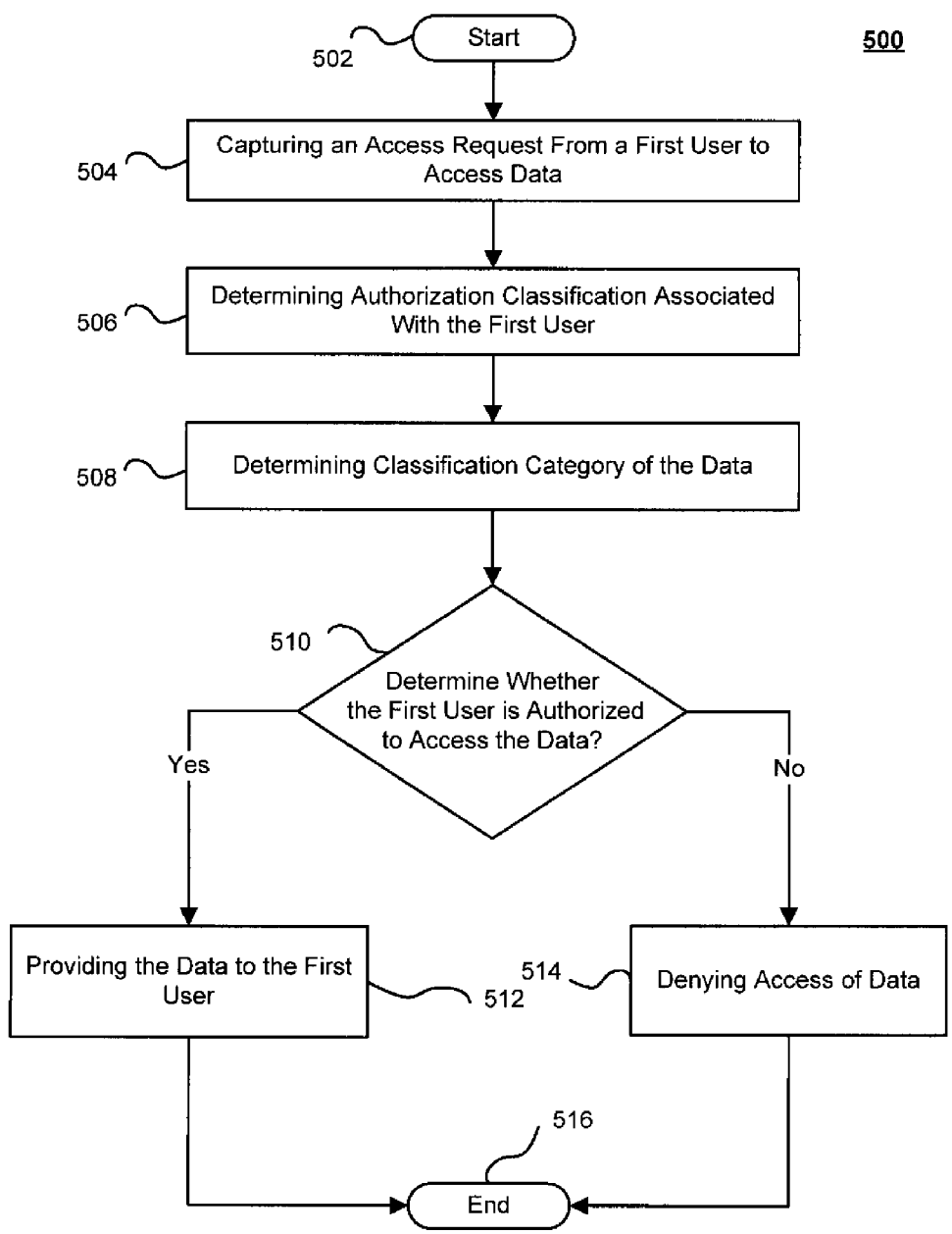
FIG. 5 depicts a method for enforcing data sharing policies on a collaboration platform in accordance with an alternate embodiment of the present disclosure.

Referring to FIG. 5, there is depicted a method 500 for enforcing data sharing policies on a collaboration platform in accordance with an alternative embodiment of the present disclosure. At block 502, the method 500 may begin.

At block 504, an access request may be captured or intercepted from a first user to access data provided by a second user. For example, a first user associated with a first client 110 may provide an access request to the collaboration platform 142 to access data provided by a second user associated with a second client 120. The access request may be captured or intercepted by the communication module 312 of the proxy policy enforcement system 300. In a particular embodiment, the access request may comprise identification information associated with the first user and the second user. The access request may also comprise identification information associated with the data requested for access by the first user. The identification information of the first user and the second user may comprise name, address, telephone number, IP address, and/or other identification information. The identification information associated with the data requested for access by the first user may comprise metadata, uniform resource identifier (URI), uniform resource locator (URL), and/or other data identification information. The communication module 312 may provide the captured or intercepted access request to the enforcement module 318.

At block 506, authorization classification of the first user and the second user may be determined. The asset and profile module 316 may determine authorization classification associated with the first user and the second user based at least in part on the subscription request. For example, the asset and profile module 316 may determine identification information associated with the first user and the second user from the access request. The asset and profile module 316 may access the user profiles to determine authorization classification of the first user and the second user based at least in part on the identification information. The asset and profile module 316 may utilize the identification information of the first user and the second user to identify user profile of the first user and the user profile of the second user. The asset and profile module 316 may search the user profiles of the first user and the second user to determine the authorization classification of the first user and the second user. The asset and profile module 316 may provide the authorization classification of the first user and the second user to the enforcement module 318.

At block 508, classification category of the data requested for access by the first user may be determined. The asset and profile module 316 may determine classification category associated with the data requested for access by the first user based at least in part on the access request. For example, the asset and profile module 316 may determine identification information associated with the data requested for access by the first user from the access request. The asset and profile module 316 may access the data classification categories to determine classification category of the data requested for access by the first user based at least in part on the identification information.

At block 510, whether the first user is authorized to access the data requested by the access requested may be determined. The enforcement module 318 may determine whether a first user is authorized to access data requested by the access request. For example, a second user of secret authorization may provide feeds in the collaboration platform having various classifications of data. The second user of secret authorization may provide feed having business development classification of data, accounting classification of data, financial classification of data, and/or other classification of data. The enforcement module 318 may determine whether the first user (e.g., having management authorization and accounting authorization) is authorized to access the feeds having data provided by the second user. In a particular embodiment, the enforcement module 318 may determine that the feeds provided by the second user comprise data of secret classification category and business development classification. The enforcement module 318 may determine that a first user trying to access the feeds provided by the second user has management authorization and accounting authorization. The enforcement module 318 may deny an access request by the first user having management authorization to access secret classification data in the feeds provided by the second user. The enforcement module 318 may deny an access request by the first user having accounting authorization to access business development classification data in the feeds provided by the second user. In another embodiment, the enforcement module 318 may determine that the feed provided by the second user comprise data of management classification and the first user trying to access the feeds has management authorization. The enforcement module 318 may approve an access request by the first user having management authorization to access management classification data in the feeds provided by the second user. The enforcement module 318 may determine that the feed provided by the second user comprise data of accounting classification and the first user requesting to access the feeds has accounting authorization. The enforcement module 318 may approve an access request by the first user having accounting authorization to access accounting classification data in the feeds provided by the second user.

At block 512, data requested for access by the first user may be provided in response to a determination that the first user is authorized to access the requested data. For example, the communication module 312 may provide the data requested for access to the first user in response to a determination that the first user is authorized to access the requested data.

At block 514, a denial message may be provided to the first user in response to a determination that the first user is not authorized to access the requested data. For example, the user interface module 310 may provide a denial message to the first user in response to a determination that the first user is not authorized to access the requested data. In a particular embodiment, the denial message may comprise "Your request is denied."

At block 516, the method 500 may end.

At this point it should be noted that enforcing data sharing policies on a collaboration platform in accordance with the present disclosure as described above typically involves the processing of input data and the generation of output data to some extent. This input data processing and output data generation may be implemented in hardware or software. For example, specific electronic components may be employed in security virtual machine or similar or related circuitry for implementing the functions associated with enforcing data sharing policies in a collaboration platform in accordance with the present disclosure as described above. Alternatively, one or more processors operating in accordance with instructions may implement the functions associated with enforcing data sharing policies on a collaboration platform in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for enforcing data sharing policies on a collaboration platform comprising:
    a communication module to capture a subscription request from a first user to follow a second user in a collaboration platform, the subscription request being a request to subscribe to a feed of information previously generated by the second user and stored in a memory;
    an asset and profile module comprising at least one computer processor to determine authorization classifications associated with the first user and the second user; and
    an enforcement module comprising at least one computer processor to determine whether to approve the subscription request based at least in part on the authorization classification associated with the first user and the second user, wherein when the subscription request has been approved, the feed is accessible to the first user independent of interaction with the feed by the second user, and to determine whether preexisting followers of the first user are authorized to follow the second user, the preexisting followers being different from the first user and the second user,
    wherein when the enforcement module determines that the preexisting followers of the first user are not authorized to follow the second user, the preexisting followers are denied from continuing to follow the first user,
    wherein the asset and profile module further determines authorization classifications associated with the preexisting followers of the first user, and
    wherein the enforcement module further determines whether the second user is authorized to follow the first user based on the authorization classifications associated with the first user, the second user, and the preexisting followers of the first user.

2. The system of claim 1, wherein the communication module is further configured to receive a user identification and a user password from at least one of the first user and the second user to login to the collaboration platform.

3. The system of claim 1, wherein the asset and profile module is further configured to store user profiles of the first user and second user.

4. The system of claim 1, wherein the asset and profile module is further configured to store a share graph of the collaboration platform, the share graph indicating a link between the first user and the second user when the subscription request to follow the second user by the first user is approved.

5. The system of claim 1, wherein the communication module is further configured to capture feeds having data provided by the first user and the second user in the collaboration platform.

6. The system of claim 5, wherein the communication module is further configured to transmit notification messages to one or more followers of at least one of the first user and the second user.

7. The system of claim 1, further comprising:
    a data sharing policy module configured to store data sharing policies of the collaboration platform.

8. The system of claim 7, wherein the data sharing policies classifies data into various categories based at least in part on one or more of authorization and activities.

9. A method for enforcing data sharing policies on a collaboration platform comprising:

capturing, using a communication module, a subscription request from a first user to follow a second user in a collaboration platform, the subscription request being a request to subscribe to a feed of information previously generated by the second user;

determining, using an asset and profile module comprising at least one computer processor, authorization classifications associated with the first user and the second user;

determining, using an enforcement module comprising at least one computer processor, whether to approve the subscription request based at least in part on the authorization classification associated with the first user and the second user, wherein when the subscription request has been approved, the feed is accessible to the first user independent of interaction with the feed by the second user: and determining, using the enforcement module, whether preexisting followers of the first user are authorized to follow the second user, the preexisting followers being different from the first user and the second user;

wherein when the enforcement module determines that the preexisting followers of the first user are not authorized to follow the second user, the preexisting followers are denied from continuing to follow the first user, wherein the asset and profile module further determines authorization classifications associated with the preexisting followers of the first user, and wherein the enforcement module further determines whether the second user is authorized to follow the first user based on the authorization classifications associated with the first user, the second user, and the preexisting followers of the first user.

10. The method of claim 9, further comprising:

subscribing the first user to follow the second user based at least in part on a determination to approve the subscription request.

11. The method of claim 9, further comprising:

identifying one or more of the preexisting followers of the first user.

12. The method of claim 11, further comprising:

determining whether the one or more preexisting followers of the first user are authorized to follow the second user in accordance with classifications associated with the one or more preexisting followers, the first user, and the second user, the one or more preexisting followers being different from the first user and the second user.

13. The method of claim 11, further comprising:

unsubscribing the one or more preexisting followers of the first user from the first user based at least in part on a determination that the one or more preexisting followers of the first user are not authorized to follow the second user.

14. At least one non-transitory processor readable storage medium for storing a computer program of instructions configured to be readable by at least one processor for instructing the at least one processor to execute a computer process for performing the method as recited in claim 9.

15. A method for enforcing data sharing policies on a collaboration platform comprising:

capturing, using a communication module, an access request from a first user to access data provided by a second user in a collaboration platform, the access request being a request for access to a feed of information previously generated by the second user;

determining, using an asset and profile module comprising at least one computer processor, authorization classifications associated with the first user and the second user and a classification category of the data provided by the second user; and determining, using an enforcement module comprising at least one computer processor, whether to approve the access request based at least in part on the authorization classification associated with the first user and the classification category of the data provided by the second user, wherein when the access request has been approved, the feed is accessible to the first user independent of interaction with the feed by the second user; and determining, using the enforcement module, whether preexisting followers of the first user are authorized to follow the second user, the preexisting followers being different from the first user and the second user;

wherein when the enforcement module determines that the preexisting followers of the first user are not authorized to follow the second user, the preexisting followers are denied from continuing to follow the first user, wherein the asset and profile module further determines authorization classifications associated with the preexisting followers of the first user, and wherein the enforcement module further determines whether the second user is authorized to follow the first user based on the authorization classifications associated with the first user, the second user, and the preexisting followers of the first user.

16. The method of claim 15, further comprising:

providing data provided by the second user to the first user based at least in part on a determination to approve the access request.

17. The method of claim 15, further comprising:

denying data provided by the second user to the first user based at least in part on a determination to deny the access request.

18. At least one non-transitory processor readable storage medium for storing a computer program of instructions configured to be readable by at least one processor for instructing the at least one processor to execute a computer process for performing the method as recited in claim 15.

* * * * *